US012039343B2

(12) United States Patent
Luban et al.

(10) Patent No.: US 12,039,343 B2
(45) Date of Patent: *Jul. 16, 2024

(54) STATE SUSPENSION FOR OPTIMIZING START-UP PROCESSES OF AUTONOMOUS VEHICLES

(71) Applicant: NVIDIA Corporation, Santa Clara, CA (US)

(72) Inventors: Mitchell Darren Luban, San Francisco, CA (US); Krishna Sitaraman, Campbell, CA (US); Bhavesh Parekh, Maharashtra (IN); Michael Truog, Los Gatos, CA (US); Hari Krishnan, San Carlos, CA (US); Karl Friedrich Greb, Sugar Land, TX (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/955,202

(22) Filed: Sep. 28, 2022

(65) Prior Publication Data

US 2023/0014569 A1    Jan. 19, 2023

Related U.S. Application Data

(63) Continuation of application No. 17/360,044, filed on Jun. 28, 2021, now Pat. No. 11,513,814.

(51) Int. Cl.
*G06F 9/00* (2018.01)
*G06F 1/3231* (2019.01)
(Continued)

(52) U.S. Cl.
CPC .......... *G06F 9/4418* (2013.01); *G06F 1/3231* (2013.01); *G06F 1/3296* (2013.01); *G07C 5/008* (2013.01); *G07C 5/02* (2013.01)

(58) Field of Classification Search
CPC ..... G06F 9/4418; G06F 1/3231; G06F 1/3296
See application file for complete search history.

(56) References Cited

U.S. PATENT DOCUMENTS 5,629,609 A * 5/1997 Nguyen ................. G05F 1/575
 323/273
5,877,956 A * 3/1999 Frank ...................... G06F 11/22
 700/79

(Continued)

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

(Continued)

*Primary Examiner* — Mohammed H Rehman
(74) *Attorney, Agent, or Firm* — Taylor English Duma L.L.P.

(57) ABSTRACT

Diagnostics and boot up for AV hardware and software of a computer system of an autonomous vehicle may be performed based at least on receiving a shutdown or power off indication, then a computing state of the computer system may be suspended with the computer system entering a low-power mode. The suspended computing state can be rapidly restored without requiring a reboot and diagnostics for key-on. To ensure the integrity of the saved computing state, the computer system may exit the low-power mode, rerun the diagnostics, reload the programs, and then reenter the low-power mode. Restoring the suspended computing state may be triggered by a user inserting an ignition key, pressing a button to turn on the vehicle, opening a door to the vehicle, remotely unlocking the vehicle, remotely starting the vehicle, etc.

20 Claims, 15 Drawing Sheets

(51) Int. Cl.
  *G06F 1/3296* (2019.01)
  *G06F 9/4401* (2018.01)
  *G06F 15/177* (2006.01)
  *G07C 5/00* (2006.01)
  *G07C 5/02* (2006.01)

(56) References Cited

U.S. PATENT DOCUMENTS

| | | | |
|---|---|---|---|
| 7,043,416 B1* | 5/2006 | Lin | G06F 9/3863 |
| | | | 712/E9.05 |
| 10,140,468 B2 | 11/2018 | Valasek et al. | |
| 10,885,698 B2 | 1/2021 | Muthler et al. | |
| 10,957,123 B2 | 3/2021 | Bachant et al. | |
| 11,513,814 B1 | 11/2022 | Luban et al. | |
| 2009/0307528 A1* | 12/2009 | Byers | G06F 11/366 |
| | | | 714/E11.178 |
| 2014/0222206 A1* | 8/2014 | Mead | B25J 9/1697 |
| | | | 700/259 |
| 2016/0342478 A1* | 11/2016 | Fryc | G06F 11/1438 |
| 2017/0307385 A1* | 10/2017 | Izumi | G05D 1/0278 |
| 2018/0343262 A1* | 11/2018 | Anderson | B60R 16/0234 |
| 2019/0049513 A1* | 2/2019 | Azam | G01R 31/3177 |
| 2021/0304805 A1* | 9/2021 | Visconti | G11C 29/50 |
| 2022/0206821 A1* | 6/2022 | Devegowda | G06F 12/0238 |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pgs.

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pgs.

* cited by examiner

STATE SUSPENSION FOR OPTIMIZING START-UP PROCESSES OF AUTONOMOUS VEHICLES

CROSS-REFERENCE TO RELATED APPLICATIONS

This application is a continuation of U.S. patent application Ser. No. 17/360,044, filed Jun. 28, 2021, which is hereby incorporated by reference in its entirety.

BACKGROUND

Designing a system to drive a vehicle autonomously without supervision at a level of safety required for practical acceptance is tremendously difficult. An Autonomous Vehicle (AV) should at least be capable of performing as a functional equivalent of an attentive driver, who draws upon a perception and action system that has an incredible ability to identify and react to moving and static obstacles in a complex environment in order to avoid colliding with other objects or structures along its path. In order to meet these standards, autonomous vehicles are running increasingly complex programs. Along with this complexity comes increased boot time for autonomous driving systems due in part to an increase in software data that must be loaded and configured. At the same time, there is an increasing requirement to reduce start-up time from key-on of the vehicle (e.g., the time from turning on the vehicle to being able to safely drive).

Before running autonomous driving software, an autonomous driving system may run initial diagnostics (such as latent fault testing). This typically requires a system reboot followed by AV hardware and AV software initialization where the AV software is loaded from persistent memory to Random Access Memory (RAM) and the diagnostics are performed. Conventionally, this process is triggered by key-on of the vehicle or an opening door. Due to the complexity of modern AV systems, it may take too long for this process to complete (for example, twenty seconds or more). One way that start-up times may be reduced is by fragmenting the vehicle architecture, for example, using a dedicated Electronic Control Unit (ECU) for cluster (rearview camera), another ECU for vehicle networking, and another for ADAS so that each of those ECUs can be purpose built to load corresponding functionality more quickly. However, the more fragmented the vehicle architecture, the more special purpose hardware and software is needed which increases system complexity. Additionally, as AV software becomes increasingly complex, even this approach may not be sufficient in and of itself to meet start-up time requirements.

SUMMARY

Embodiments of the present disclosure relate to suspended states for rapid start-up of autonomous vehicles. Systems and methods are disclosed that reduce the startup time needed to bring a computer system (and, by extension, an autonomous vehicle) into a fully operational mode after key-on.

In contrast to conventional systems, such as those described above, diagnostics and boot up for AV hardware and software of a computer system of an autonomous vehicle may be performed based at least on receiving a shutdown or power off indication, then a computing state of the computer system may be suspended with the computer system entering a low-power mode. The suspended computing state can be rapidly restored when the autonomous vehicle is turned back on without requiring a reboot and diagnostics for key-on.

To enter the low-power mode, the computer system may perform various diagnostic functions, run safety mechanisms, and then reload programs in a memory storage medium, such as Random Access Memory (RAM). While in the low-power mode, certain components of the computer system may be fully powered, certain components may be partially powered, and certain components may be powered off. To ensure the integrity of the saved computing state, the computer system may exit the low-power mode after a certain interval of time. Upon termination of the interval, the computer system may rerun the diagnostics, reload the programs to RAM, and then reenter the low-power mode. When the driver returns to the vehicle, the computer system may exit the low-power mode (e.g., due to receiving an indication of a key-on event). Because the diagnostics were performed before the entry into low-power mode, further diagnostics may not be needed. Further, because the programs are already in the RAM, the time until the programs are ready to run may be substantially reduced. Thus, the computer system may have a faster startup time, even where a more generalized system architecture is employed (e.g., a single ECU), allowing for a simpler and more cost-effective system.

BRIEF DESCRIPTION OF THE DRAWINGS

The present systems and methods for suspended states for computer system in an autonomous vehicle are described in detail below with reference to the attached drawing figures, wherein.

DETAILED DESCRIPTION

Figure 1:
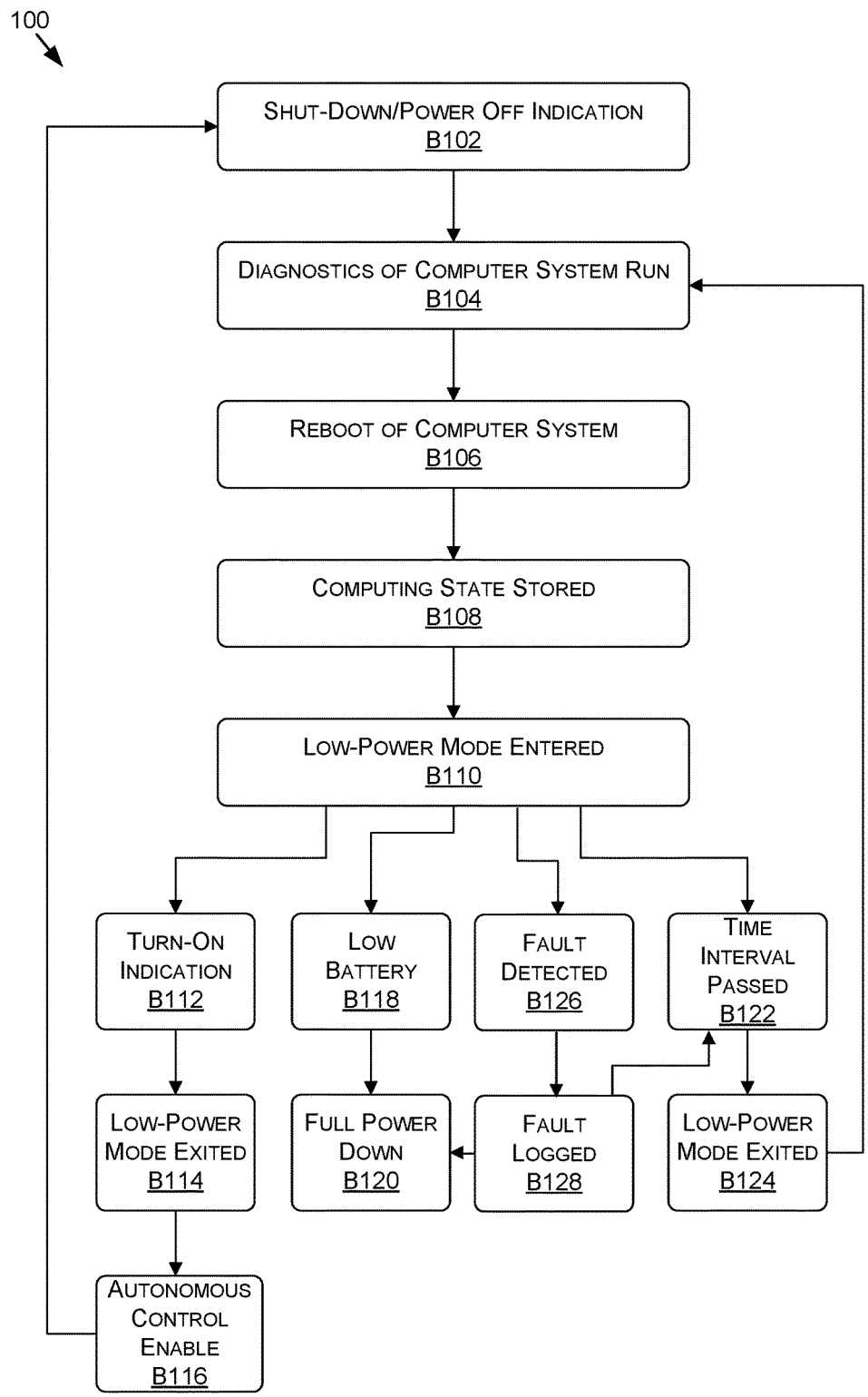
FIG. 1 is a flow diagram illustrating a method for entering and leaving suspended states, in accordance with some embodiments of the present disclosure.

Systems and methods are disclosed related to suspended states for rapid start-up of autonomous vehicles. Although the present disclosure may be described with respect to an example autonomous vehicle 800 (alternatively referred to herein as "vehicle 800" or "ego-vehicle 800," an example of which is described with respect to FIGS. 8A-8D), this is not intended to be limiting. For example, the systems and methods described herein may be used by, without limitation, non-autonomous vehicles, semi-autonomous vehicles (e.g., in one or more Adaptive Driver Assistance Systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to booting and suspending computer systems for autonomous vehicles, this is not intended to be limiting, and the systems and methods described herein may be used in augmented reality, virtual reality, mixed reality, robotics, security and surveillance, autonomous or semi-autonomous machine applications, and/or any other technology spaces where the booting and suspending of computers may be used.

In one or more embodiments, a computer system may enter a low-power mode upon an indication (e.g., from the driver and/or system component) of a key-off (e.g., a shutdown or power off) of the vehicle. For example, the user may remove an ignition key, press a physical or virtual button to turn off the vehicle, exit the vehicle, etc. In one or more embodiments, the computer system may end a drive cycle that was at least partially autonomously operating the vehicle. This may include shutting down various sensors and displays. In one or more embodiments, the computer system will run diagnostics on the hardware. In any powered component there may be a chance of flipping bits or other errors accumulating during operation. For example, these errors may be at least partially caused by radiation (such as solar radiation, alpha particles, etc.). The diagnostics may check for error accumulation during the operation of the various components. These diagnostics may include latent fault checks.

In one or more embodiments, the computer system will at least partially reinitialize or reboot into a drive cycle prior to performing diagnostics. In one or more embodiments, the computer system will suspend components and save the current state in RAM after the diagnostics and/or reboot. Latent fault checks that may be performed as at least a part of the diagnostics may destroy, compromise, or otherwise affect the current state of the processor. Safety of the system may be ensured by issuing a full reboot of the system after completion of latent fault checks and prior to suspending to RAM. The computer system may then enter a low-power mode. Low-power mode may refer to any of various modes that reduce the power usage of the computer system, as discussed herein. Other components may be disabled or placed into a standby state. In one or more embodiments, the system may continue executing diagnostics while performing the low power mode entry, disabling safety mechanisms only at the point in which the logic hosting the mechanism is disabled.

The computer system may remain in the low-power mode until triggered to leave the low-power mode. Three examples of triggers will be briefly discussed, by way of example and not limitation. First, the computer system may detect or determine that the operator has returned to the vehicle, causing the computer system to leave the low-power mode and enter the normal operating mode. The normal operating mode may include autonomous control and other functions performed at full power. Second, a certain interval of time may pass such that the computer system may rerun the diagnostics, reload the programs, and reenter the low-power mode. Third, under a certain battery-level threshold (or other threshold), the computer system may leave the low-power mode and fully shutdown or power off (so as to prevent further battery drain). While a battery is described herein, description related to a battery may apply to one or more energy storage mediums (e.g., a capacitor, etc.).

In the low-power mode, the most power-hungry components may be powered off. Examples of components powered off may include a Central Processing Unit (CPU) and Graphics Processing Unit (GPU). The CPU and/or GPU may be used, in part, to power autonomous driving functions, for example, computer vision using neural networks. While in the low-power mode, certain components may be fully powered (examples include a vehicle battery, power pre-regulation circuitry, power sequencers, voltage regulators for an always-on segment of the processor, voltage regulators for DRAM, etc.). The vehicle battery may provide power to the computer system from a switch or directly from the vehicle battery. While in the low-power mode, certain components may be partially powered (examples include power management integrated circuits, an always-on segment of the processor(s), flex rays, Ethernet, etc.). Some of these may be powered directly from the battery, and may be configured to provide wake signals to the other components as needed to exit the low-power mode. Also while in the low-power mode, certain components may be totally powered off (examples include graphics processing units, microcontroller units, vehicle harness, peripherals, sensors, and displays). A microcontroller unit and/or other controllers may be used for safety, to check on the other aspects of the system, and to do power control.

As described herein, the computer system may stay in the low-power mode for a certain time interval. For example, the time interval may be eight hours or twenty-four hours. The time interval may be a static number, a static number that is programmable (such as by the vehicle manufacturer or end-customer), or may be dynamic. After the interval the computer system may briefly emerge from the low-power mode, rerun the diagnostics, reinitialize the programs, reboot, and reenter the low-power mode. This cycle may continue until an exit event is detected, such as a key-on indication is received or the battery falls below a certain level.

In one or more embodiments, the entry to the low-power mode may run on key-off (or some other indication to end the drive cycle). However, the entry to the low-power mode can be configurable to run on a variety of potential criteria or conditions being satisfied. The user may also be presented with an option to fully power down if desired.

The computer system may exit the low-power mode so as to enable normal autonomous driving operations. Exiting the low-power mode may be triggered by an indication that a return to normal driving operations is incipient or imminent. For example, the user may insert an ignition key, press a button to turn on the vehicle, open a door to the vehicle, remotely unlock the vehicle, remotely start the vehicle, etc.

To exit the low-power mode, a wake-up signal may be sent to the microcontroller unit (and/or other controller). The microcontroller unit may trigger the computer system to leave the low-power mode based at least on the wake-up signal. Upon being triggered, the computer system may leave the low-power mode. Leaving the low-power mode may include (for example and without limitation) tasks or operations such as: turning on clocks, sensors, and displays. Leaving the low-power mode may also include (for example and without limitation) tasks or operations such as: authenticating, restoring a saved state, and otherwise readying the computer system for normal operations. Because the computing state was saved in the RAM (and/or other storage medium), the computer system can move much more rapidly into normal operations (e.g., where the autonomous vehicle is ready for autonomous control) than conventional processes and solutions. For example, all application states and sensor states may already be in RAM.

In some instances, the computer system may move from a low-power mode to a power-off mode or state. The computer system may move to the power-off mode based at least on one or more criteria being satisfied. For example, the computer system may move to the power-off mode upon a battery level being below a certain threshold. As another example, the computer system may move to the power-off mode based at least on a time-out of a total time in the low-power mode. In these instances, the microcontroller unit may be woken by a microcontroller power management circuit. The microcontroller unit may confirm the time-out and then instruct various components in the low-power mode to fully shutdown or power off. The microcontroller may also place its power management circuit into a standby mode and then power itself off. Some components, for example, the power management circuit, may remain powered in the power-off state to allow for revival. The computer system may remain in the power-off mode until a key-on or other indication is received (e.g., the batter has been sufficiently charged, the vehicle has been plugged-in, etc.).

With reference to FIG. 1, FIG. 1 is a flow diagram illustrating a method 100 for entering and leaving suspended states, in accordance with some embodiments of the present disclosure. Each block of method 100 (and other methods described herein) comprises a computing process that may be performed using any combination of hardware, firmware, and/or software. For instance, various functions may be carried out by a processor executing instructions stored in memory. The method 100 may also be embodied as computer-usable instructions stored on computer storage media. The method 100 may be provided by a standalone application, a service or hosted service (standalone or in combination with another hosted service), or a plug-in to another product, to name a few. In addition, the method 100 is described, by way of example, with respect to the computer system 200 of FIG. 2. However, the method 100 may additionally or alternatively be executed by any one system, or any combination of systems, including, but not limited to, those described herein.

Figure 2:
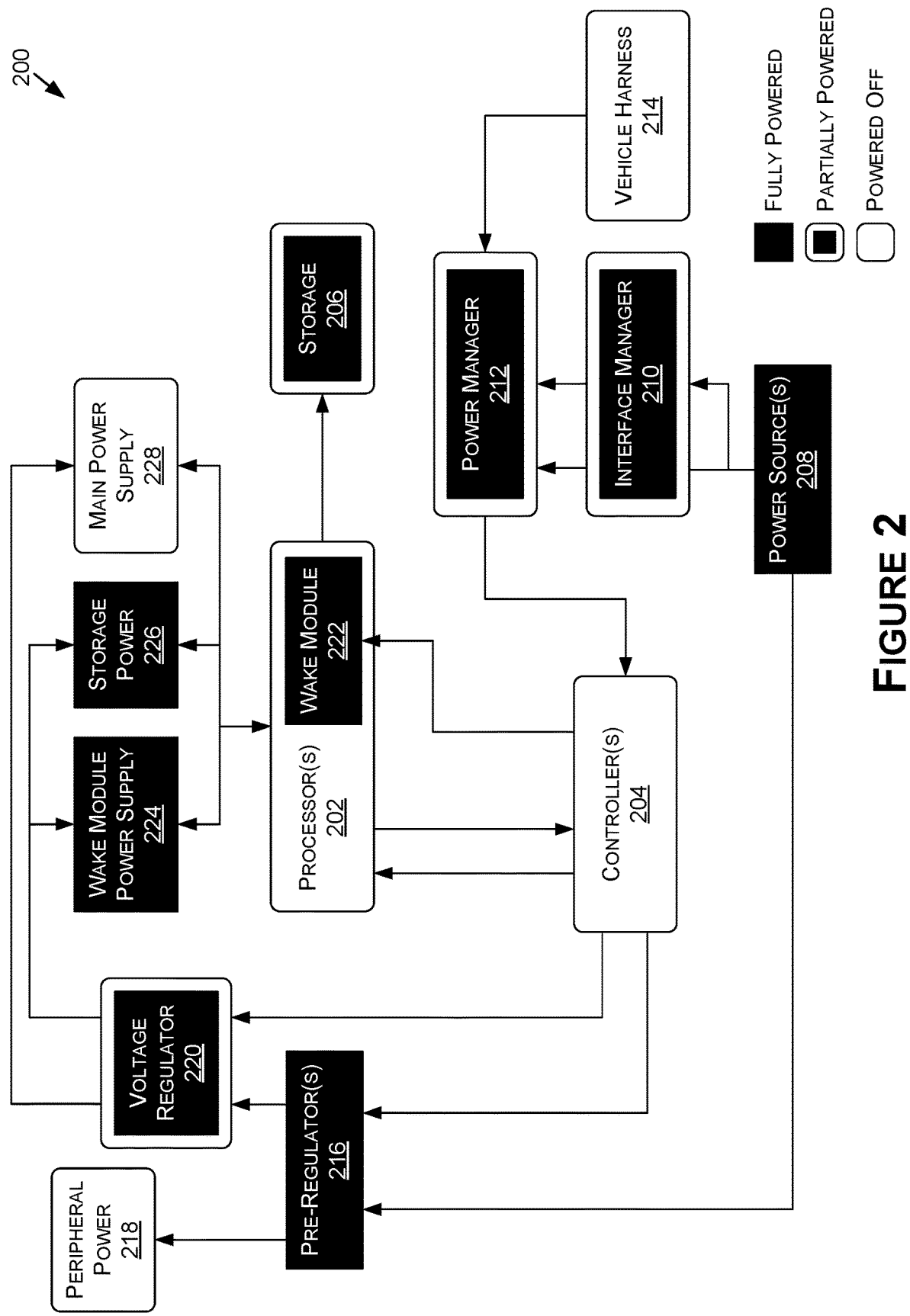
FIG. 2 is a system diagram illustrating components of a computer system of an autonomous vehicle, in accordance with some embodiments of the present disclosure.

The method 100 may be used for booting, suspending states of, and loading states of a computer system 200 (e.g., an ECU) of FIG. 2 to enable autonomous control of an autonomous vehicle (e.g., the vehicle 800). However, the method 100 may also be used for other types of computer systems or to enable other types of functionalities using the computer system. In embodiments of the disclosure, the method 100 may run on key-off of the autonomous vehicle. The method 100 may also be configurable to run on certain criteria or conditions in addition to or instead of key-off. Further, a user may have an option to fully power down the computer system 200 of the vehicle if desired, instead of running the method 100 and placing the computer system 200 into the low-power mode. For example, if the user knows that the autonomous vehicle will not be used for a long time, the user may select to fully power down the vehicle instead of allowing the autonomous vehicle to enter the method 100, which may be performed by default.

The method 100, at block B102, includes a receipt or detection of a power off indication. The computer system may begin entry into a low-power mode based at least on the shutdown or power off indication, such as an indication from the driver (and/or system component) that the vehicle has ceased operating or is to cease operating (and/or that autonomous control is to be disabled). For example, the user may remove an ignition key, press a button to turn off the vehicle, exit the vehicle, etc. Based on the shutdown or power off indication, the computer system may end a drive cycle that was autonomously operating the vehicle. This may include shutting down various sensors and displays of the vehicle.

The method 100, at block B104, includes diagnostics being run on the computer system, such as an ECU. The computer system may run any of a variety of diagnostics on the hardware. In one or more embodiments, the diagnostics may be performed using In-System Testing (IST). During normal computer operations, bits in the computer system may flip or experience other errors or faults. These errors and faults may be due to radiation (solar radiation, alpha particles, etc.) or other external sources, or may be otherwise caused while powered. The diagnostics performed may include latent fault checks to determine and correct such errors. While not shown in FIG. 1, in one or more embodiments, the computer system may at least partially reboot prior to the diagnostics (e.g., based on the shutdown or power off indication of block B102 and/or based on a low-power mode being exited at block B124).

The method 100, at block B106, includes a reboot of the computer system. The computer system may at least partially reboot back into a drive cycle following the diagnostics. The computer system may perform the reboot at least in part because the latent fault checks destroyed a current state of the processor. The reboot may create a new computing state that includes a current loaded instance of one or more programs used for autonomous control and/or other functions of the autonomous vehicle.

The method 100, at block B108, includes the computing state being stored. For example, the computing state may be stored in one or more computer storage media which may include at least one volatile memory, such as random access memory (RAM). Storing the computing state before entering the low-power mode may allow the computing state to be recalled quickly upon leaving the low-power mode without having to perform a full reboot.

The method 100, at block B110, includes a low-power state being entered. To enter the low-power state, the computer system may suspend one or more components discussed herein. Other components may be disabled or placed into a standby state. Examples of such components are further discussed in reference to FIG. 2. In some embodiments, the low-power mode is System Control 7 (SC7), Where a System Control may refer to a system power state. Other System Controls may include System Control 0 where the computer system is at full power or System Control 8 where the system is fully powered off (e.g., save for wake circuitry). Other levels and configurations of low-power modes may also be used.

In one or more embodiments, after the lower-power mode is entered at the block B110, various other functions may be performed depending on various criterion being satisfied. For example, blocks B112-B116, B118-B120, B122-B124, or B126-128 may occur. Regarding the blocks B112-B116, the method 100, at block B112, includes a power on or start up indication occurring. The power on or start up indication may trigger an exit from the low-power mode and may comprise, by way of example and not limitation, an indication that a return to normal driving operations is incipient, imminent, or otherwise desired. The power on or start up indication may be received from a component that is external to the computer system (e.g., ECU) in the autonomous vehicle, from a sensor communicatively coupled with the computer system, and/or from some other electronic device (e.g., a key-fob). In one or more embodiments, the user may trigger the power on or start up indication by interacting with the autonomous vehicle in some way. For example, the user may insert an ignition key, press a button to turn on the vehicle, open a door to the vehicle, remotely unlock the vehicle, remotely start the vehicle, approach the vehicle with a registered, wirelessly communicative device, etc.

The method 100, at block B114, includes the low-power mode being exited. For example, a controller may trigger a processing system and other components of the computer system to leave the low-power mode. This may include the controller instructing a power manager to provide power to various components, as described herein. The controller and/or the processing system may also turn on clocks, sensors, and displays. This may include authenticating, booting, and/or otherwise readying the computer system for normal operations. Because the previous computing state was saved in the storage (e.g., according to block B108), the computer system can move into run time without loading and initializing all of the AV software and hardware configurations. For example, all application states and sensor states may already be loaded in the computing state saved in the storage.

The method 100, at block B116, includes autonomous control being enabled. For example, with the computing state having been revived from the storage, the computer system may take autonomous control of the vehicle. The computer system may remain in autonomous control of the vehicle until a shutdown or power off indication is received or another event occurs. For example, the method 100 may loop back to block B102 and continue another cycle.

Regarding the blocks B118-B120, the method 100, at block B118, includes a low-power source occurring. For example, a low-battery may be determined by the computer system, a component external to the computer system, or by some other device. In one or more embodiments, the lower power source may be determined based at least on a power level being below a threshold value.

The method 100, at block B120, includes the computer system being fully powered down. By fully powering down, the drain on the power source will stop or be greatly reduced.

Continuing to operate in the low-power mode when the power source falls below a certain threshold may be disadvantageous because the power source being low may prevent the autonomous vehicle from starting or operating for a sufficiently long period of time. For example, in the case of an internal-combustion-powered vehicle, a low battery may prevent the starter from successfully starting the engine. Similarly, in the case of an electric-powered vehicle, a low battery may reduce the range available to the electronic vehicle. Blocks B122-B124 may be used to ameliorate such situations. Regarding the blocks B122-B124, the method 100, at block B122, includes a certain time interval having passed (and/or other condition being satisfied). The time interval may indicate that the diagnostics should be performed again to remain in the low-power mode.

The computer system may stay in the low-power state for a certain time interval. For example, the time interval may be eight hours or twenty-four hours. The time interval may be a pre-determined number, a static number that is programmable (such as by the vehicle manufacturer or end-customer), or may be dynamic. After the interval, the computer system may briefly emerge from the low-power state, rerun the diagnostics, reinitialize the programs, and reenter the low-power mode (e.g., according to blocks B104-B110). In one or more embodiments, the computer system may also reboot prior the block B104.

Thus, the method 100, at block B124, includes the low-power mode being exited, after which the method 100 may then return to block B104 (e.g., after a reboot), such that the diagnostics can be performed again. The computer system may then reboot, store the computing state, then re-enter the low-power mode (e.g., at block B110). The computer system may repeat this cycle, for example, so long as the power source (e.g., battery) has sufficient power and a power on or start up indication has not been received. Where the power source is being charged externally, the computer system may repeat this cycle until a power on or start up indication is received (e.g., as discussed in the block B112.

The method 100, at block B126, may include one or more faults being detected while the computer system is in the low-power mode. For example, a controller may perform a diagnostic while the processing system and other components of the computer system are in the low-power mode. This may include the controller instructing the processor, the power manager, or other component to test for one or more faults periodically or upon some trigger. The diagnostic may be the same as, or distinct from, the diagnostic performed in block B104.

The method 100, at block B128, may include the fault being logged after being detected in block B126. The logging of the fault may create or update a record indicative of what component and what type of fault was detected, and may include various sensor readings and the like associated with the fault. In some embodiments of the present disclosure, following the fault being detected and/or logged, the controller may instruct a full power down. This full power down may include one or more steps described in block B120 herein. In other embodiments of the present disclosure, following the fault being detected and/or logged, the computer system may continue in the low power mode for the time interval passes (such as discussed in block B122) and/or a power on or start up indication is received (such as discussed in block B112). In these embodiments, the logged fault may be further evaluated and tested upon the computer system returning to the full power mode (such as discussed in blocks B114 and/or B124). If the fault is verified after returning to the full power mode, the controller may instruct the computer system to fully power down (such as discussed in block B120).

With reference to FIG. 2, FIG. 2 is an example computer system 200 for the autonomous vehicle 800 or other machine. The computer system 200 may have one or more processing systems 202. The one or more processing systems 202 may load and run autonomous control software for an autonomous vehicle, and/or may perform other functions. The computer system 200 may also have one or more controllers 204. The controller(s) may include a microcontroller unit (MCU) or other controller. The controller(s) 204 may be used for safety to check on, instruct, and monitor the other components of the computer system 200. The controller(s) 204 may also control the provision of power to the other components of the computer system 200. The computer system 200 may also have computer storage 206 (e.g., volatile memory storage). The computer storage 206 may comprise one or more computer storage media, such as RAM, and may include dynamic random access memory (DRAM) in one or more embodiments. The computer system 200 may also have or have access to non-volatile memory (not illustrated) for the storing of the various programs and configurations for the processing system 202. This memory may be used to load the programs and configurations during reboot of the computer system 200, as described herein.

The computer system 200 may further have, or otherwise be associated with a power source 208. Examples of the power source 208 include a vehicle battery, such as a battery that provides power to an electrically powered vehicle, a battery that provides electrical functions to an internal-combustion-powered vehicle, a dedicated battery for the electronic control unit, and/or other battery. The computer system 200 may additionally have an interface manager 210. The interface manager may manage one or more communications interfaces, such as those of a controller area network (CAN), an Ethernet network, a FlexRay network, and/or other network or interface types. In one or more embodiments, the interface manager 210 may include a CAN controller, an Ethernet physical layer (such as a chip or software that sends and receives Ethernet frames), a FlexRay communication bus, and/or other components. The computer system 200 may also have a power manager 212. By way of example, the power manager may include a power manager integrated circuit (PMIC). The power manager 212 may interface with a vehicle harness 214 as well as the controller 204.

The computer system 200 may further have one or more pre-regulators 216. The pre-regulator(s) 216 may be configured to reduce ripple present in the output power from the power source 208. The pre-regulator(s) 216 may additionally or alternatively reduce or minimize power dissipation at the voltage regulator 220. The pre-regulator(s) 216 may interface with peripheral power 218. The peripheral power 218 may provide power, directly or indirectly, to any of various peripheral components (such as sensors described herein).

The voltage regulator 220 may provide power to the various other components of the computer system 200, including a wake module 222 on the processing system 202. The wake module 222 may include an always-on segment of the processing system 202, and/or a segment that is capable of being on while the processing system 202 is in a low-power mode. The voltage regulator 220 may provide power to the wake module 222 via a wake module power supply 224, which may comprise a voltage regulator for the always-on segment of the processing system 202. The voltage regulator 220 may also provide power to the computer storage 206 via a storage power supply 226. The voltage regulator may also provide power to the processing system 202 via a main power supply 228 of the processing system 202 (e.g., while the processing system 202 is not in a low-power mode and/or under normal operations).

As described herein, in the low-power mode, certain components may receive full power, partial power, or no power. In various embodiments, components may be selected for the full, partial, or no power based upon their functionality and the need during and for leaving the low-power mode. To enter the low-power mode, the most power-hungry components of the computer system 200 may be powered off. This may include a central processing unit (CPU) and/or GPU, which may be components of or otherwise associated with the processing system 202. For example, the processing system 202 may be or comprise one or more of the SoCs 804 of FIG. 8C. Further the processor(s) 810, the CPU(s) 806, the accelerator(s) 814, and/or the GPU(s) 808 may be powered off for low-power mode. In embodiments where the processing system 202 includes the logic unit(s) 920 of FIG. 9, they may also be powered off for low-power mode.

While in the low-power mode or state, certain components may be fully powered (examples include the power source 208, the pre-regulator 216, the wake module 222, the wake module power supply 224, the storage power supply 226, etc.) as shown in FIG. 2. The vehicle battery, or other power source 208, provides power to the electronic control unit and may be from a switch or directly from the vehicle. While in the low-power state, certain components may be partially powered (examples include the power manager 212, the interface manager 210, the computer storage 206, the processing system 202, etc.). Some of the partially powered components may be powered from the power source 208, and may be configured to provide wake signals to the other components. For example, the power manager 212 may be configured to provide one or more wake signals to the wake module 222 in order to wake the processing system 202 from the low-power mode. While in the low-power mode, certain components may be totally powered off (examples include the most power-hungry components of the processing system 202 describes herein, the controller(s) 204, the vehicle harness 214, and peripherals, sensors, and/or displays which may be powered by the peripheral power 218). Various safety mechanisms may be partially or fully powered during the low-power mode. Examples of these safety mechanisms may be related to monitoring and controlling power, clocks, temperature, and other variables to ensure safe operation of the computer system 200 upon leaving the low-power mode which may further improve startup time by reducing the amount of testing needed on wake.

Figure 3A:
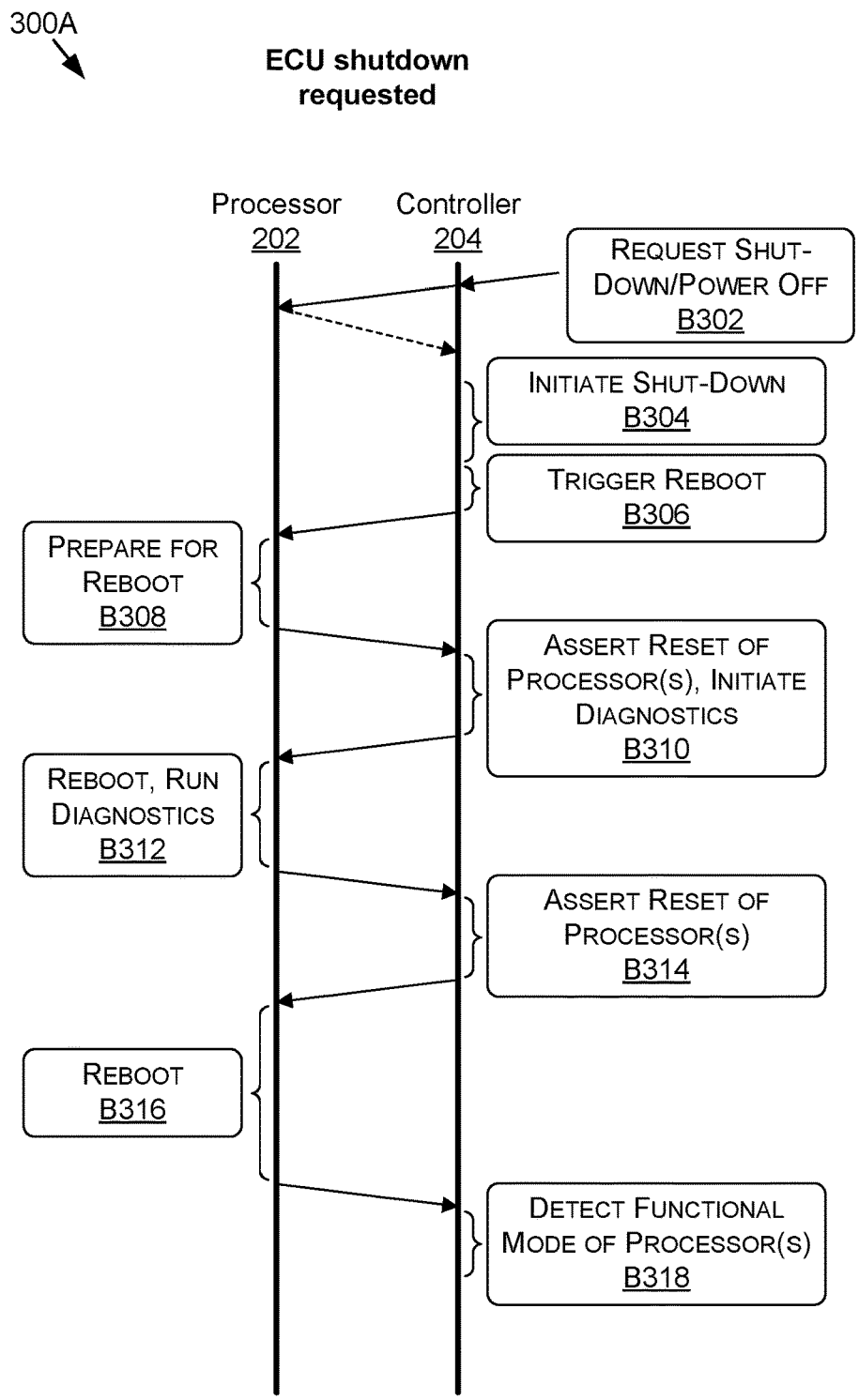
FIG. 3A is a flow diagram illustrating processing of a request to enter a suspended state, as performed by a processing system and a controller, in accordance with some embodiments of the present disclosure.
Figure 3B:
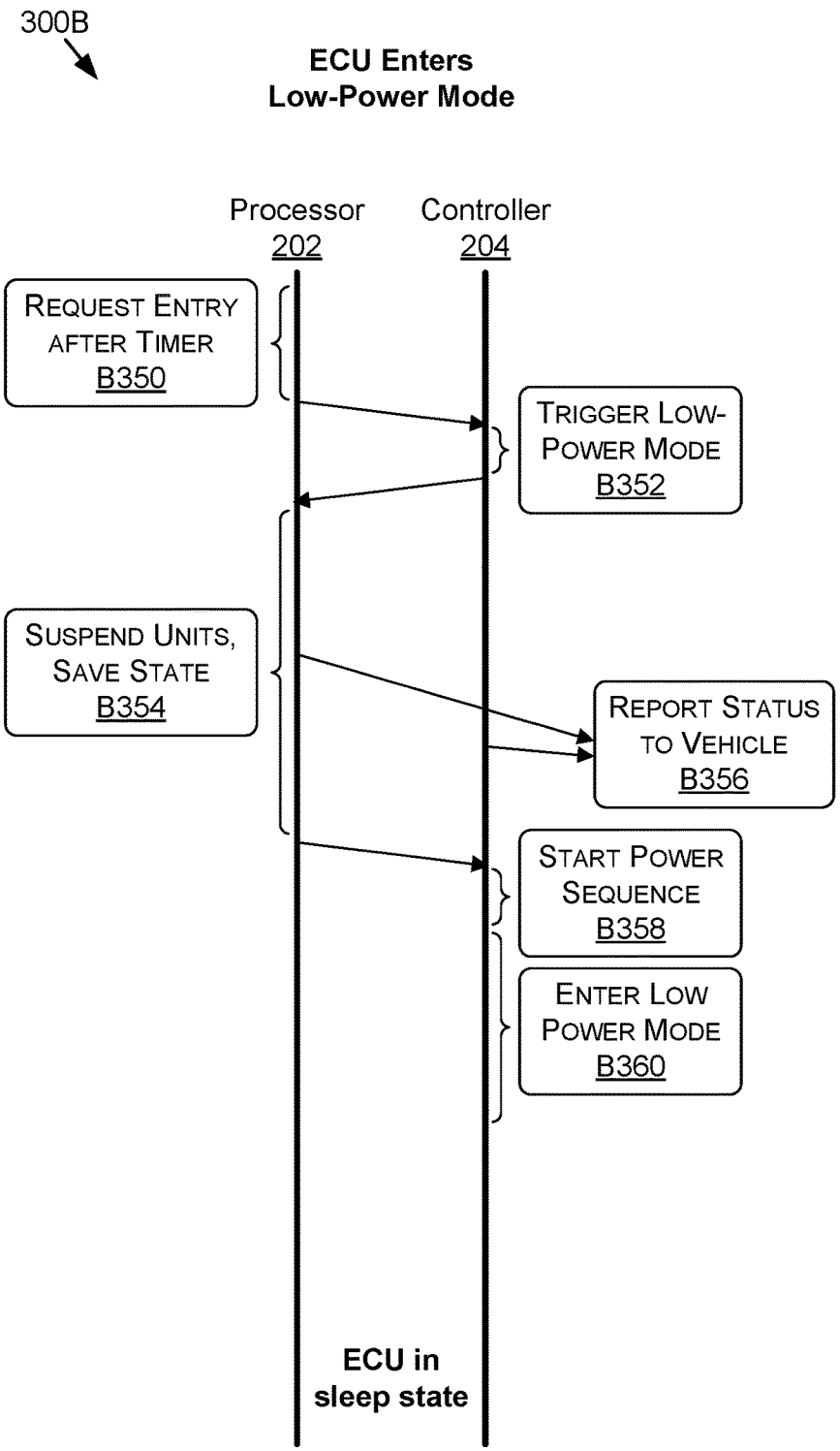
FIG. 3B is a flow diagram illustrating entering the suspended state, as performed by the processing system and the controller, in accordance with some embodiments of the present disclosure.

Now referring to FIGS. 3A-3B, general flows between the processing system 202 and the controller 204 are shown. By way of example, the processing system 202 and the controller 204 may interact according to the general flows to implement at least some of the blocks B102-B110 of the method 100. FIG. 3A depicts an example flow diagram 300A that includes receiving and processing a shutdown or power off request for the computer system 200. FIG. 3B depicts an example flow diagram 300B that includes entering a low-power mode in response to the shutdown or power off request received and processed in the flow diagram 300A.

Functions that may be performed by the processing system 202 are shown on a left side of FIGS. 3A and 3B, and steps that may be performed by the controller 204 are shown on a right side of FIGS. 3A and 3B. FIGS. 3A and 3B generally show the passage of time moving downward for an example process. It should be appreciated that the length of the time lapses shown are merely an example and that time lapses may vary in the amount of time in or between each block without deviating from the scope of the current disclosure. Similarly, the arrows shown between the two sides may be indicative of one or more messages or status updates sent between the processing system 202 and the controller 204, or may be indicative of a next step taken without any information or message being sent between the processing system 202 and the controller 204. In particular, the arrows and the time intervals are merely to explain the concepts involved to the reader.

In flow diagram 300A, block B302 includes the controller 204 requesting a shutdown or power off of the processing system 202, for example, in response to a shutdown or power off indication from a vehicle component outside of the computer system 200. The controller 204 may send this shutdown or power off request to the processing system 202. Block B304 includes the controller 204 initiating a power-down sequence of the processing system 202. Block B306 includes the controller 204 triggering a reboot of the processing system 202. Block B308 includes the processing system 202 preparing for the reboot, as triggered by the controller 204. The processing system 202 may report ready for reboot back to the controller 204, or the controller 204 may wait a certain time interval. Block B310 includes the controller 204 asserting the reset of the processing system 202. The controller 204 may also initiate the diagnostics to be performed by the processing system 202. Block B312 includes the processing system 202 rebooting and subsequently running the diagnostics, as instructed by the controller 204. Upon the completion of the diagnostics, the processing system 202 may report completion to the controller 204. The report may include an indication that no faults were found, an indication of any faults found, or other information. Block B314 includes the controller 204 asserting a reset of the processing system 202 upon an indication that the diagnostics have been completed. Block B316 includes the processing system 202 rebooting into a functional operating mode. The functional operating mode may include loading all or a portion of programs, applications, functions, and other computer instructions associated with the autonomous control of the autonomous vehicle. Block B318 includes the controller 204 detecting (or otherwise receiving an indication of) the functional mode of the processing system 202 being entered.

In flow diagram 300B, block B350 includes the processing system 202 requesting entry into the low-power mode after expiry of a certain timer. The timer may allow for a cancellation of the low-power mode. Block B352 includes the controller 204 triggering the low-power mode and responding to the processing system 202. Block B354 includes the processing system 202 suspending units and saving the computing state to computer storage 206. The suspended units may include any of the various components of the computer system 200, and may additionally or alternatively include various other components external to the computer system 200, such as peripherals, sensors, displays, input devices, output devices, and/or other electronic devices. The computing state, which may have been generated using block B316 of the flow diagram 300A and detected using block B318 of the flow diagram 300A, may be saved to the computer storage 206. This may allow the computing state to be recalled from the computer storage 206 upon booting. Block B356 includes the controller 204 reporting a status to one or more components of the autonomous vehicle that are external to the computer system 200. Block B356 may be performed by the controller 204 while the processing system 202 is suspending units and/or saving the computing state. Block B358 includes the processing system 202 starting a power-down sequence. Block B360 includes the processing system 202 placing at least a portion of the computer system 200 into the low-power mode.

Figure 4A:
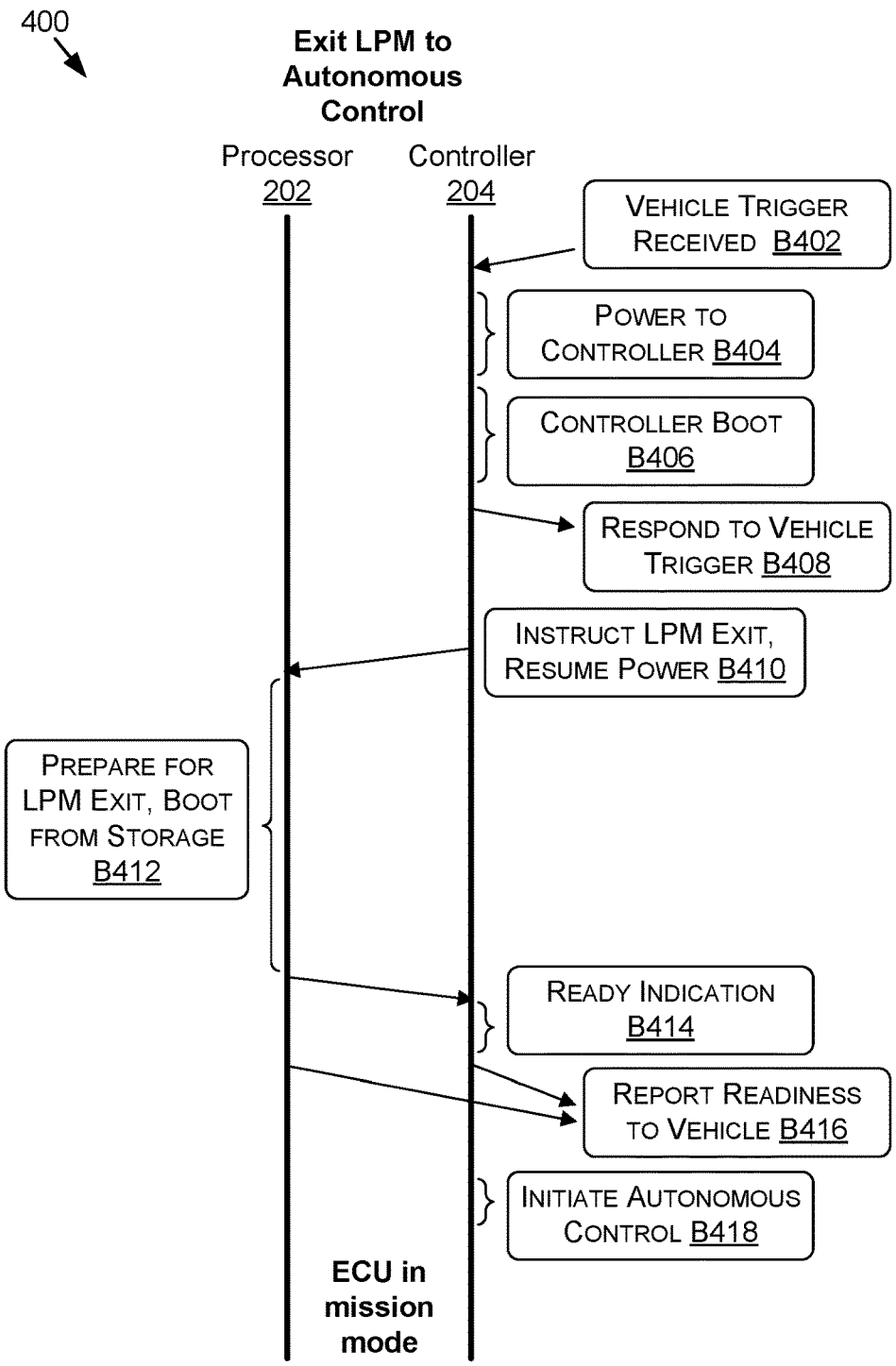
FIG. 4A is a flow diagram illustrating exiting the suspended state to resume autonomous control, as performed by the processing system and the controller, in accordance with some embodiments of the present disclosure.

Now referring to FIGS. 4A, FIG. 4A is a flow diagram 400A illustrating exiting the suspended state to resume autonomous control, as performed by the processing system 202 and the controller 204, in accordance with some embodiments of the present disclosure. By way of example, the processing system 202 and the controller 204 may interact according to the flow diagram 400A to implement at least some of the blocks B112-B114 of the method 100.

Block B402 includes the controller 204 receiving a vehicle power on or start up trigger or indication. The trigger may be received from the vehicle harness 214 via the power manager 212. Block B404 includes the provision of power to the controller 204, such as by the power manager 212. For example, the power may be provided from the power source 208 via the power manager 212. Block B406 includes the controller 204 booting. The controller 204 may begin any of various operations to process the power on or start up trigger and begin the process of instructing the other components of the computer system 200 to exit the low-power mode. Block B408 includes the controller 204 responding to the power on or start up trigger. For example, the controller 204 may send a message to a component outside of the computer system 200 indicating that the power on or start up trigger was received and is being processed.

Block B410 includes the controller 204 instructing the processing system 202 to exit the low-power mode and resume normal operations. The controller 204 may instruct the pre-regulator 216 and/or the voltage regulator 220 to provide power (e.g., full power) to corresponding components of the computer system 200, as described herein. Also, the pre-regulator 216 and/or the voltage regulator 220 may provide power to the processing system 202, the peripherals, the computer storage 206, and other components.

Block B412 includes the processing system 202 preparing to exit of the low-power mode. This may include restoring the computing state from the computer storage 206. Block B414 includes the processing system 202 indicating to the controller 204 that the processing system is ready for autonomous control. Block B416 includes the controller 204 sending a report of readiness of the processing system 202 to a component outside of the computer system 200. The B418 includes the controller 204 instructing the processing system 202 to take autonomous control of the autonomous vehicle. The processing system may then take autonomous control until a subsequent shutdown or power off indication is received, or some other event occurs or is detected.

Figure 4B:
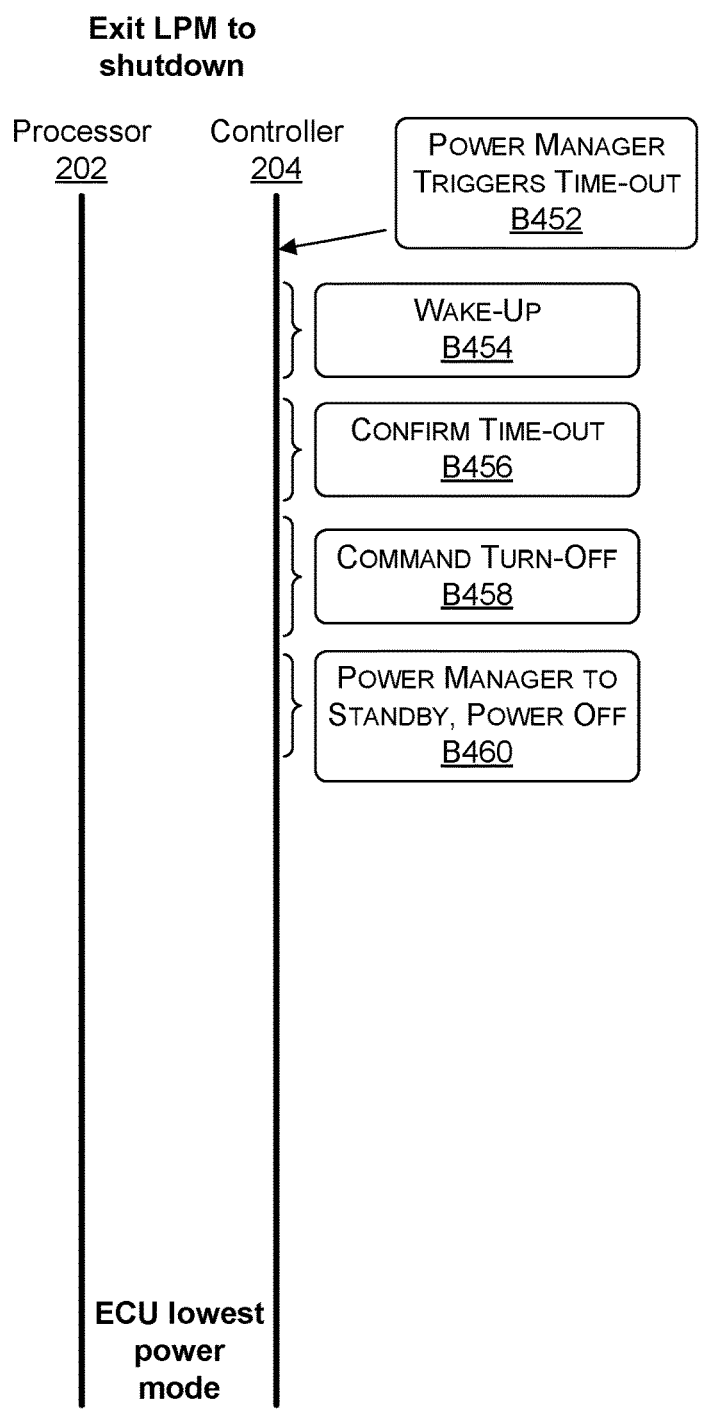
FIG. 4B is a flow diagram illustrating exiting the suspended state to a powered-off state, as performed by the processing system and the controller, in accordance with some embodiments of the present disclosure.

Now referring to FIG. 4B, FIG. 4B is a flow diagram 400B illustrating exiting the suspended state to a powered-off state, as performed by the controller 204, in accordance with some embodiments of the present disclosure. By way of example, the controller 204 may act according to the flow diagram 400B to implement at least some of the blocks B122-B124 of the method 100.

Block B452 includes the power manager 212 triggering a time-out from the low-power mode due to a low battery, a total time in a cycle of low-power modes, or other trigger. Block B454 includes the controller 204 being powered by the power manager 212 in response to the power manager 212 waking-up. Block B456 includes the controller 204 confirming the time-out due to the trigger. Block B458 includes the controller 204 instructing a power-off of other components in the computer system 200 (e.g., being powered by a low-power mode rail). Block B460 includes the controller 204 placing the power manager 212 in standby mode and powering itself off. During power-off, all rails of the computer system 200 may be off except that the power manager 212 may be in the standby or sleep mode. Further, the interface manager 210 may be in a low power standby mode.

Figure 5:
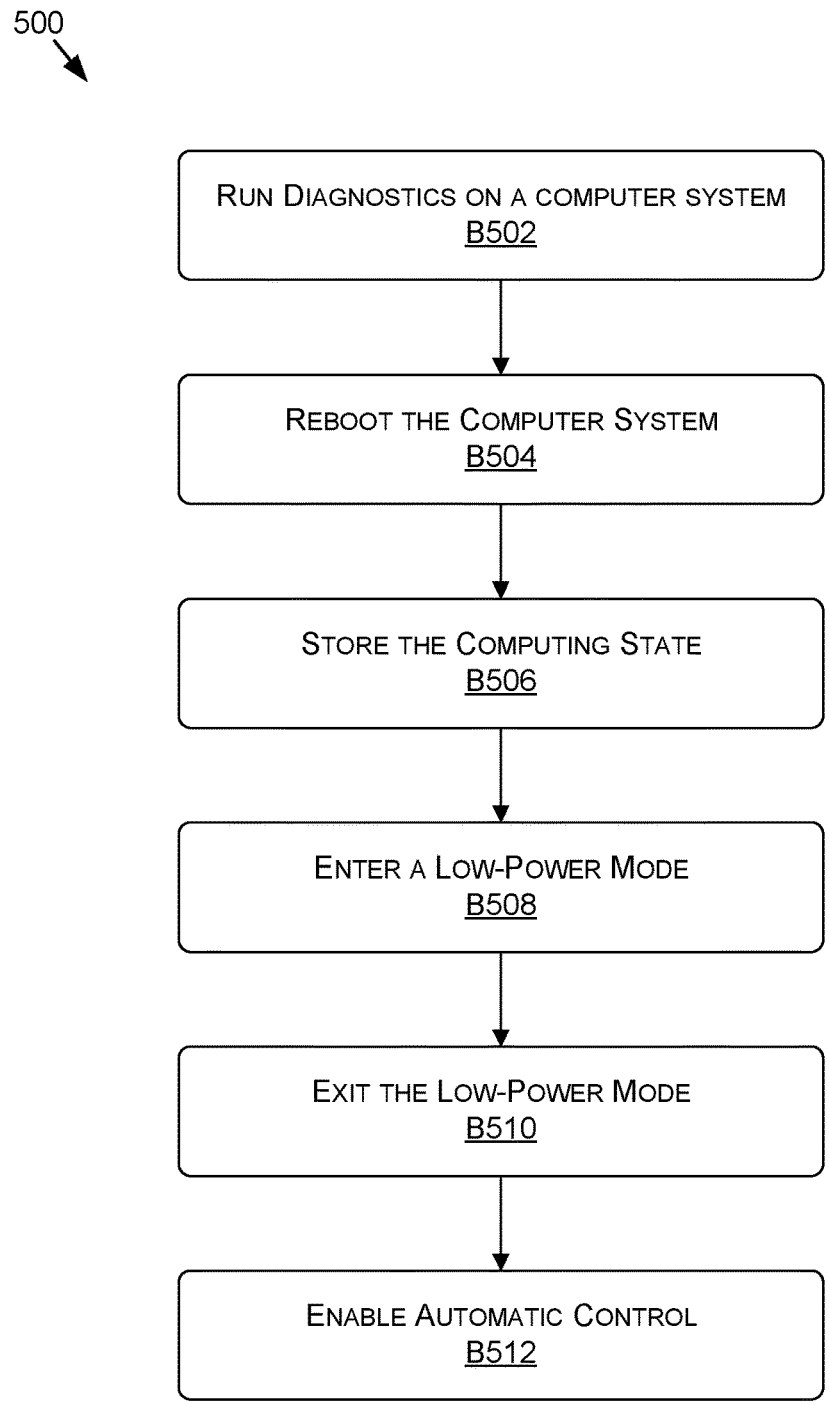
FIG. 5 is a flow diagram illustrating a method of entering and leaving a low-power mode to resume autonomous control, in accordance with some embodiments of the present disclosure.

FIG. 5 is a flow diagram illustrating a method 500 of entering and leaving a low-power mode to resume autonomous control, in accordance with some embodiments of the present disclosure. The method 500 is described, by way of example, with respect to the computer system 200 of FIG. 2. However, the method 500 may additionally or alternatively be executed by any one system, or any combination of systems, including, but not limited to, those described herein.

The method 500, at block B502, includes running diagnostics on a computer system. For example, the processing system 202 may run diagnostics on the computer system 200 used for autonomous control of a machine (e.g., the vehicle 800), based at least on a shutdown or power off indication of the machine.

The method 500, at block B504, includes rebooting the computer system. For example, the processing system 202 may reboot one or more portions of the computer system 200 based at least in part on the diagnostics to configure the computer system 200 to a computing state.

The method 500, at block B506, includes storing the computing state. For example, the processing system 202 may store the computing state in the computer storage 206 as a saved state.

The method 500, at block B508, includes entering a low-power mode. For example, the processing system 202 may enter a low-power mode while the saved state is stored in the computer storage 206.

The method 500, at block B510, includes exiting the low-power mode. For example, the processing system 202 may exit the low-power mode based at least on a power on or start up indication of the machine.

The method 500, at block B512, enabling the autonomous control. For example, the processing system may enable autonomous control of the machine by the computer system 200 based at least on restoring the saved state from the computer storage 206.

Figure 6:
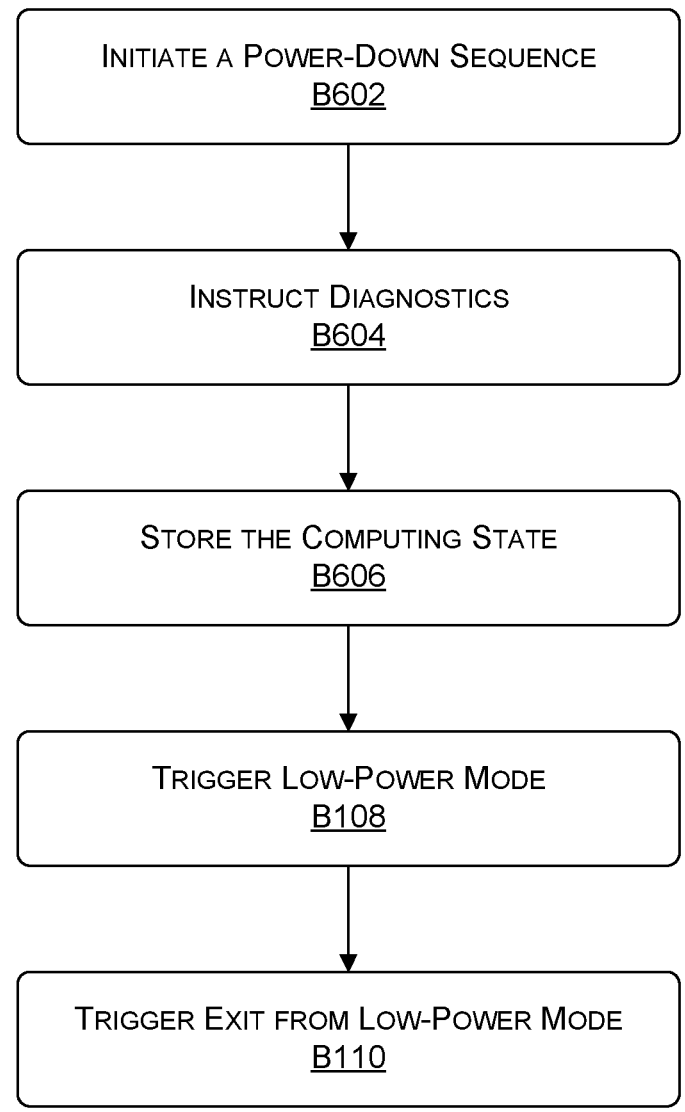
FIG. 6 is a flow diagram illustrating a method of controlling a processing system to enter and leave a low-power mode, in accordance with some embodiments of the present disclosure.

Referring now to FIG. 6, FIG. 6 is a flow diagram illustrating a method of controlling a processing system to enter and leave a low-power mode, in accordance with some embodiments of the present disclosure. The method 600 is described, by way of example, with respect to the computer system 200 of FIG. 2. However, the method 600 may additionally or alternatively be executed by any one system, or any combination of systems, including, but not limited to, those described herein.

The method 600, at block B602, includes initiating a power-down sequence. For example, the controller 204 may initiate a power-down sequence in response to detecting a shutdown or power off indication of a vehicle (e.g., the vehicle 800).

The method 600, at block B604, includes instructing diagnostics to be run. For example, the controller 204 may instruct the computer system 200 used for autonomous control of the vehicle to perform diagnostics.

The method 600, at block B606, includes instructing a reboot to be performed. For example, the controller 204 may instruct one or more portions of the computer system 200 (e.g., the processing system 202) to reboot to configure the computer system 200 to a computing state and to store the computing state in the computer storage 206 as a saved state.

The method 600, at block B608, includes triggering a low-power mode. For example, the controller 204 may trigger a lower-power mode for one or more components within the computer system 200 while the saved state is stored in the computer storage 206.

The method 600, at block B610, includes triggering an exit from the low-power mode. For example, the controller 204 may trigger an exit from the low-power mode based at least on a power on or start up indication of the vehicle, the triggering of the exit enabling the autonomous control of the vehicle by the computer system 200 based at least on the saved state being restored from the computer storage 206.

Figure 7:
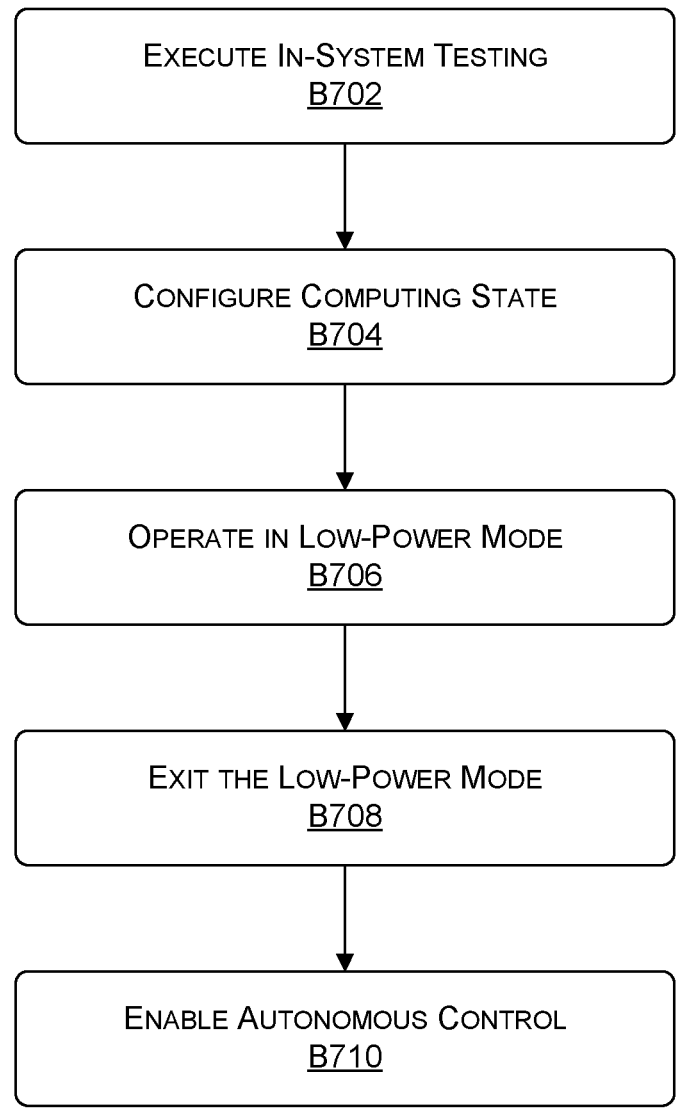
FIG. 7 is a flow diagram illustrating a method of instructing the entering and leaving of a low-power mode, in accordance with some embodiments of the present disclosure.

Now referring to FIG. 7, FIG. 7 is a flow diagram illustrating a method 700 of instructing the entering and leaving of a low-power mode, in accordance with some embodiments of the present disclosure. The method 700 is described, by way of example, with respect to the computer system 200 of FIG. 2 (discussed herein). However, this method 700 may additionally or alternatively be executed by any one system, or any combination of systems, including, but not limited to, those described herein.

The method 700, at block B702, includes executing in-system testing. For example, the processing system 202 may execute in-system testing of the computer system 200 used for autonomous control of a vehicle, based at least on a first indication of a key-off of the vehicle.

The method 700, at block B704, includes configuring a computing state. For example, the processing system 202 may configure the computer system 200 to a computing state that is capable of effectuating the autonomous control based at least on completion of the in-system testing.

The method 700, at block B706, includes operating in a low-power mode. For example, the processing system 202 may operate in a low-power mode while the computing state is stored in the computer storage 206 as a saved state.

The method 700, at block B708, includes exiting the low-power mode. For example, the processing system 202 may exit the low-power mode based at least on a second indication of a key-on of the vehicle.

The method 700, at block B710, includes enabling autonomous control. For example, the processing system 202 may enable autonomous control of the machine by the computer system 200 based at least on restoring the saved state from the computer storage 206.

Example Autonomous Vehicle

Figure 8A:
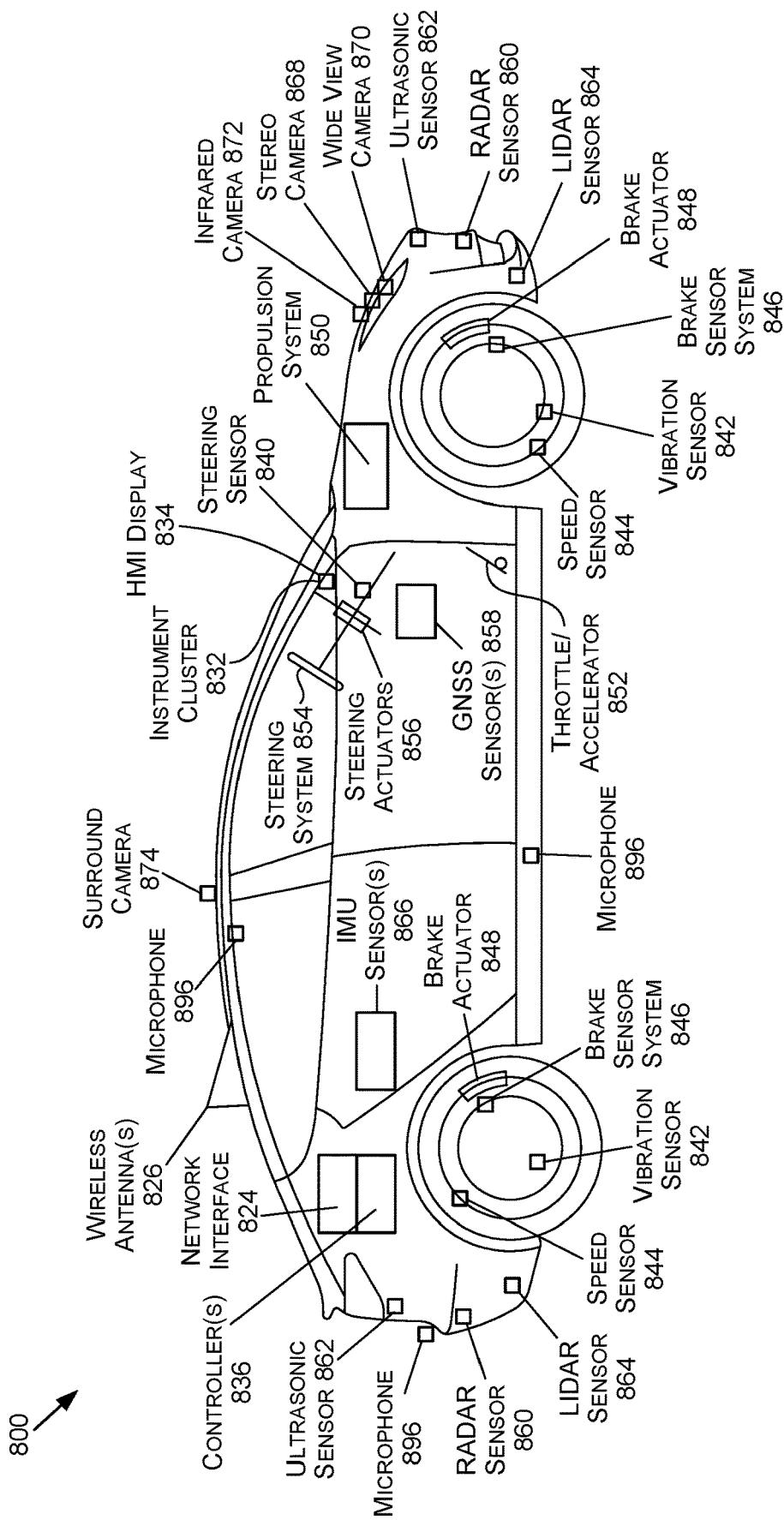
FIG. 8A is an illustration of an example autonomous vehicle, in accordance with some embodiments of the present disclosure.

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 1-Level 5 of the autonomous driving levels. For example, the vehicle 800 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 800 or other machine, such as being fully autonomous, being highly autonomous, being conditionally autonomous, being partially autonomous, providing assistive autonomy, being semi-autonomous, being primarily autonomous, or other designation.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the HD map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824 which may use one or more wireless antenna(s) 826 and/or modem(s) to communicate over one or more networks. For example, the network interface 824 may be capable of communication over LTE, WCDMA, UMTS, GSM, CDMA2000, etc. The wireless antenna(s) 826 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 8B:
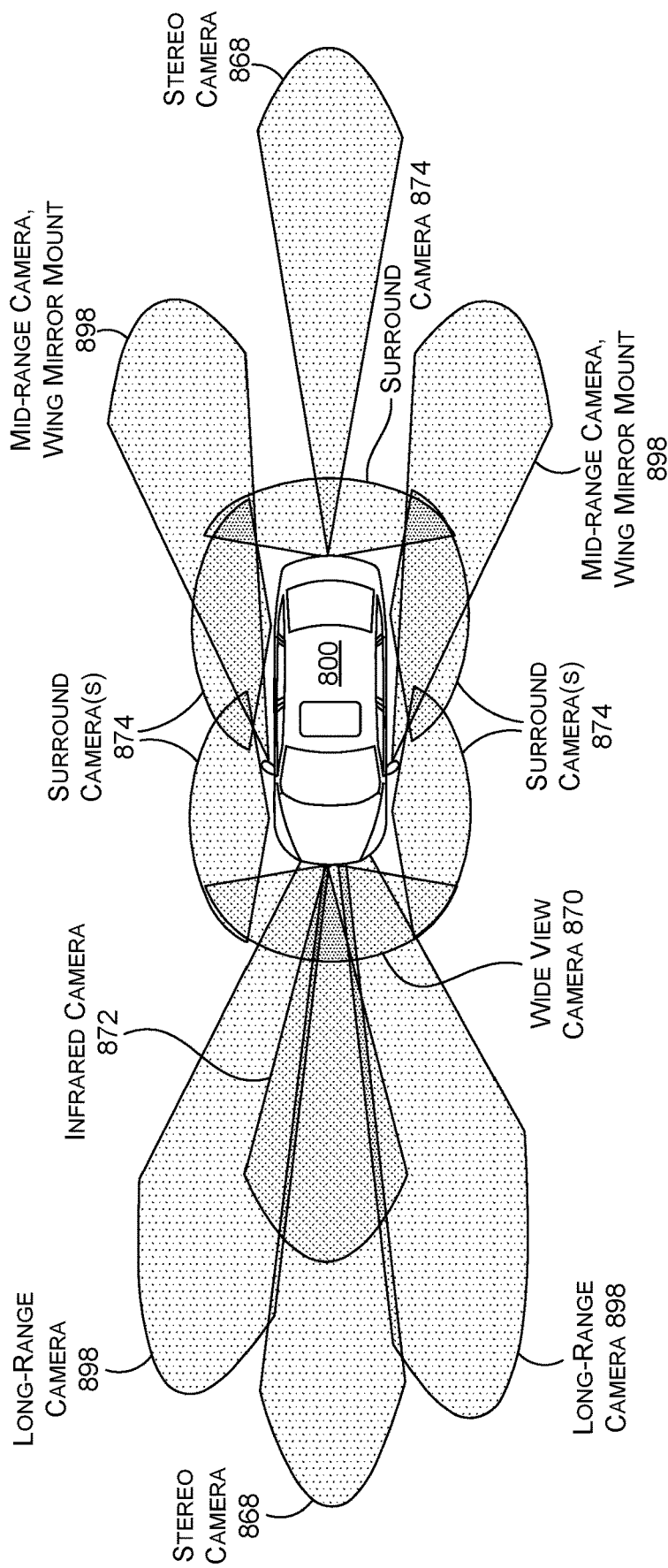
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may any number of wide-view cameras 870 on the vehicle 800. In addition, long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

One or more stereo cameras 868 may also be included in a front-facing configuration. The stereo camera(s) 868 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Figure 8C:
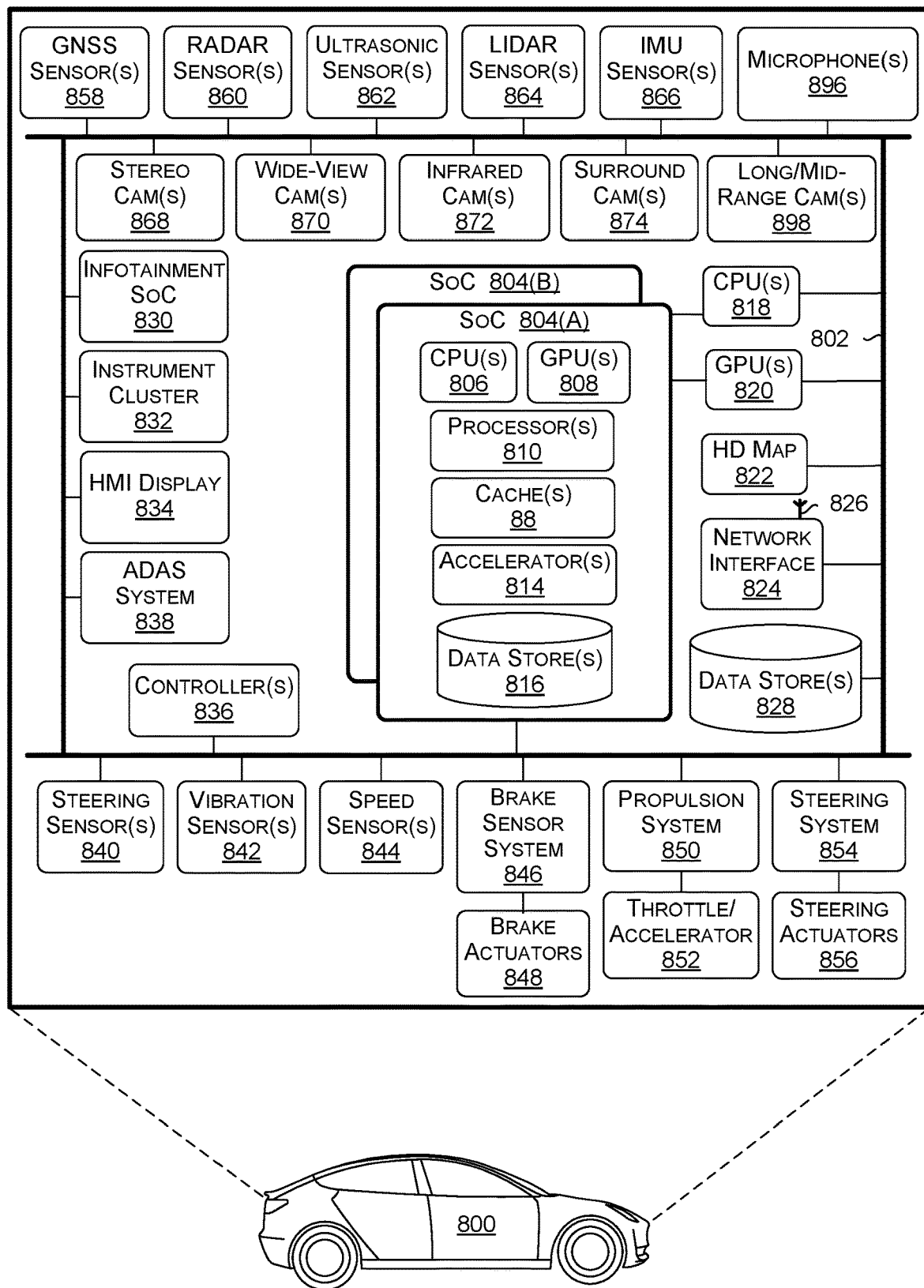
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. From another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. That may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS, assisted GPS sensors, differential GPS (DGPS) sensors, etc.), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for a 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 120-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
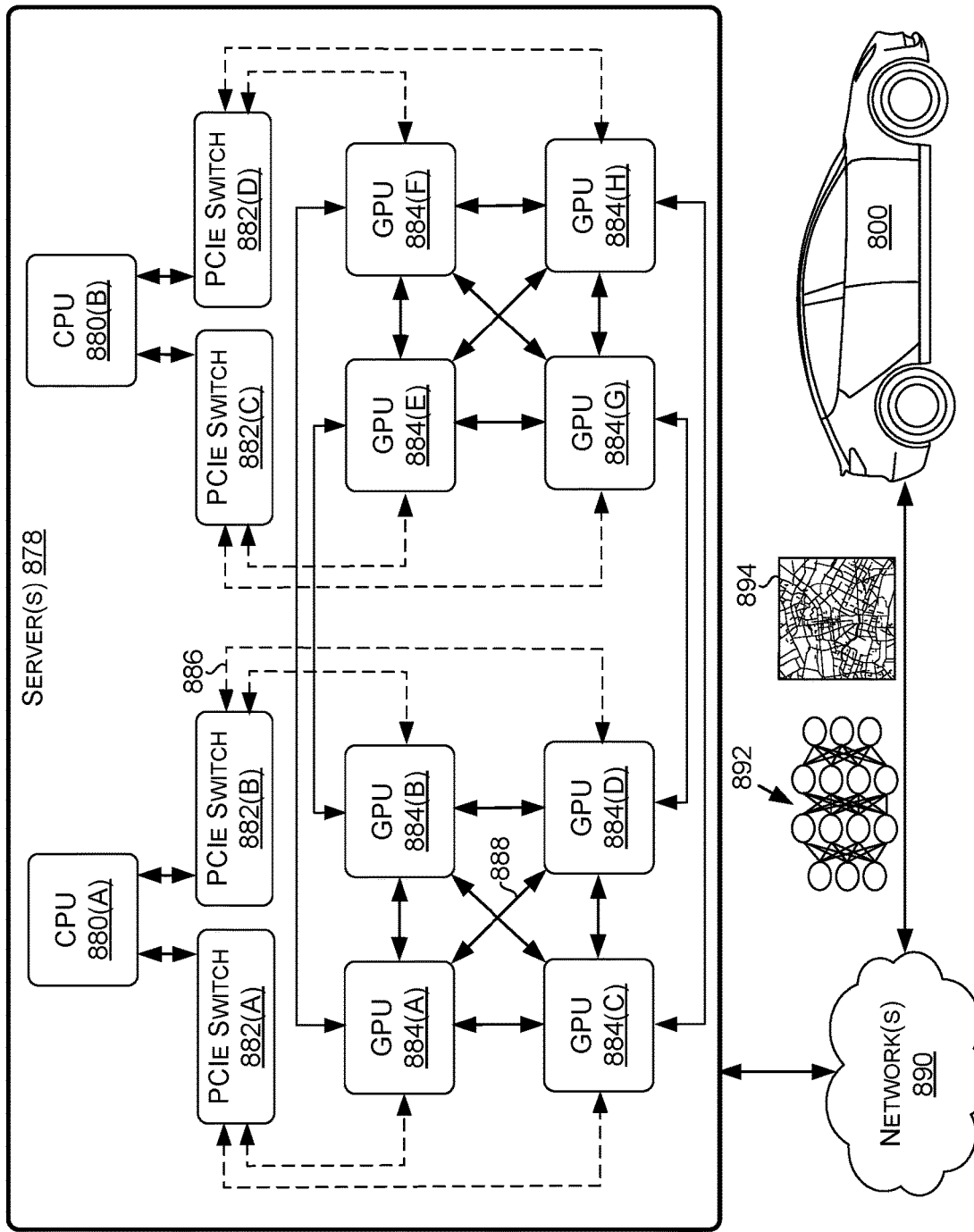
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
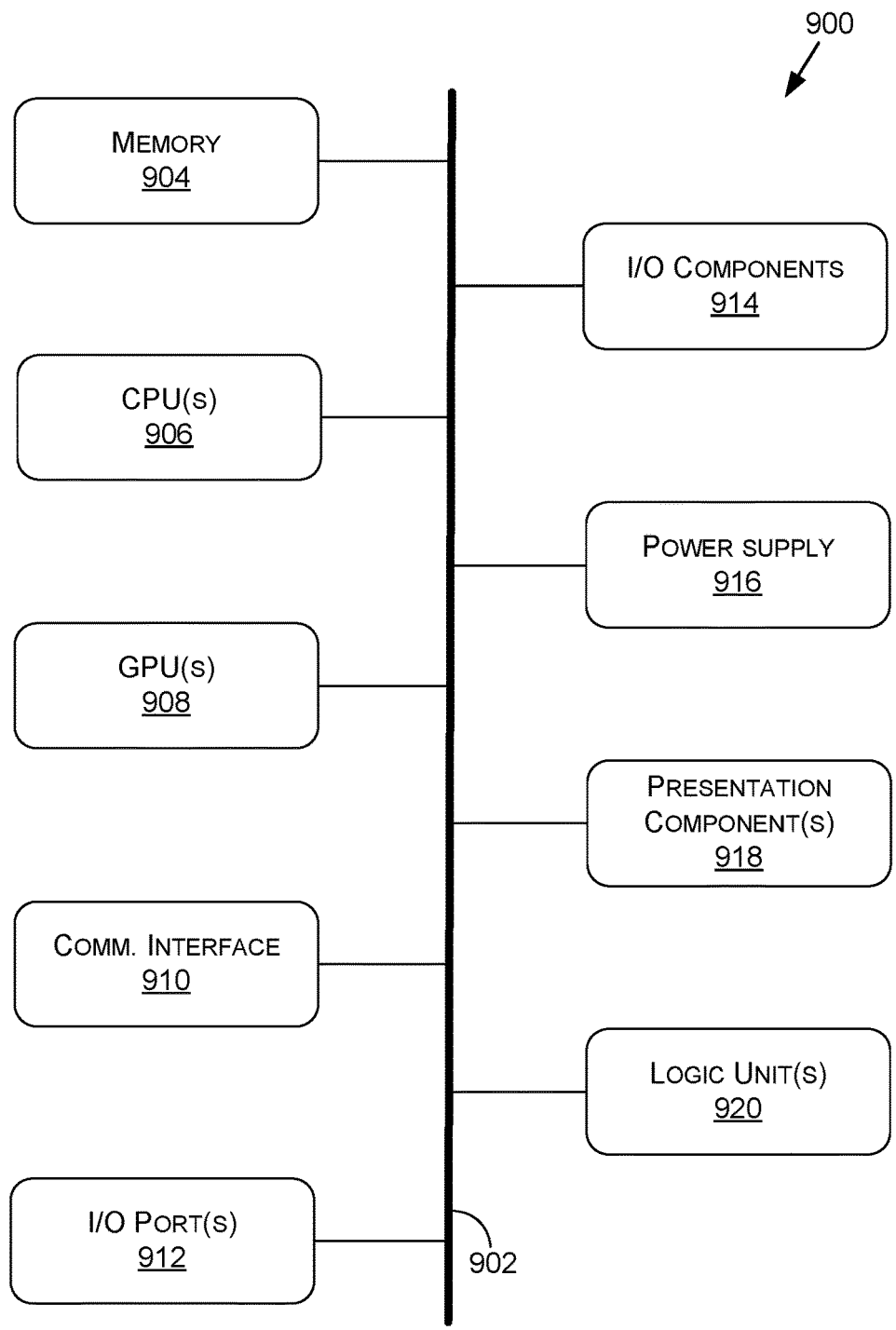
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, etc.), and output the data (e.g., as an image, video, sound, etc.).

Example Data Center

Figure 10:
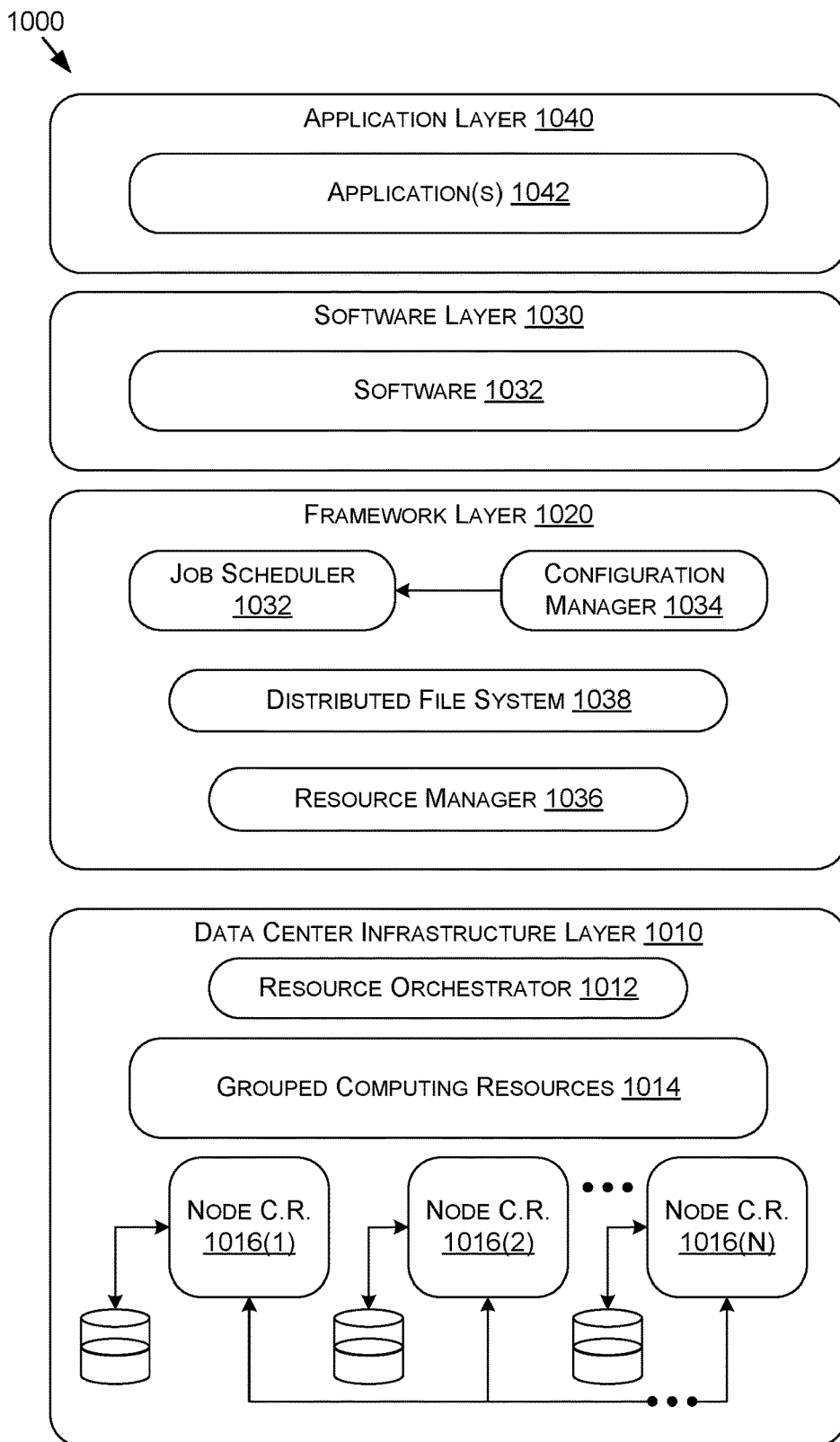
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161(N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, and/or other processors may be grouped within one or more racks to provide compute resources to support one or more workloads. The one or more racks may also include any number of power modules, cooling modules, and/or network switches, in any combination.

The resource orchestrator 1022 may configure or otherwise control one or more node C.R.s 1016(1)-1016(N) and/or grouped computing resources 1014. In at least one embodiment, resource orchestrator 1022 may include a software design infrastructure ("SDI") management entity for the data center 1000. The resource orchestrator 1022 may include hardware, software, or some combination thereof.

In at least one embodiment, as shown in FIG. 10, framework layer 1020 may include a job scheduler 1048, a configuration manager 1034, a resource manager 1036, and/or a distributed file system 1038. The framework layer 1020 may include a framework to support software 1048 of software layer 1030 and/or one or more application(s) 1042 of application layer 1040. The software 1048 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1032 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1032. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:
one or more circuits to:
execute a power-down process of one or more computer systems of one or more machines, the power-down process including operations to:
detect completion of one or more diagnostics operations, the one or more diagnostics operations testing the one or more computer systems;
based at least on the completion of the one or more diagnostics operations suspend one or more portions of a state of the one or more computer systems to computer storage; and
cause the one or more computer systems to enter into a lower-power mode; and
based at least on receiving at least one trigger for the one or more computer systems to exit the lower-power mode, execute a power-up process of the one or more computer systems, the power-up process including operations to:
cause the one or more computer systems to exit from the lower-power mode; and
restore the one or more portions of the state from the computer storage, the one or more portions of the state being used to perform one or more control operations corresponding to the one or more machines.

2. The processor of claim 1, wherein the operations of the power-down process are to based at least on the completion of the one or more diagnostics operations, reboot at least a portion of the one or more computer systems to produce the one or more portions of the state.

3. The processor of claim 1, wherein the power-down process is triggered by one or more of:
one or more power-off indications of the one or more machines; or
one or more terminations of one or more time intervals corresponding to a power mode of the one or more computer systems.

4. The processor of claim 1, wherein the suspending the one or more portions of the state includes one or more of:
powering down one or more sensors used to perform the one or more control operations; or
powering down one or more parallel processing units used to perform the one or more control operations.

5. The processor of claim 1, wherein the one or more circuits are included in a controller that generates control signals used to cause the one or more control operations to be performed.

6. The processor of claim 1, wherein the at least one trigger comprises a power-on indication associated with the one or more machines.

7. The processor of claim 1, wherein the one or more diagnostics operations include latent fault testing of one or more components of the one or more computer systems.

8. The processor of claim 1, wherein the processor is comprised in at least one of:
a control system for an autonomous or semi-autonomous machine;
a perception system for an autonomous or semi-autonomous machine;
a system for performing simulation operations;
a system for performing deep learning operations;
a system implemented using an edge device;
a system implemented using a robot;
a system incorporating one or more virtual machines (VMs);
a system implemented at least partially in a data center; or
a system implemented at least partially using cloud computing resources.

9. A system comprising:
one or more processing units to perform operations including:
executing a power-down process of one or more computer systems of one or more machines, the power-down process including:
receiving at least one indication of completion of one or more diagnostics operations, the one or more diagnostics operations testing one or more computer systems of one or more machines;
based at least on the at least one indication being received, triggering the one or more computer systems to suspend one or more portions of a state of the one or more computer systems to computer storage; and
cause the one or more computer systems to enter into a lower-power mode; and
based at least on at least one trigger for the one or more computer systems to exit the lower-power mode, executing a power-up process of the one or more computer systems, the power-up process including transmitting one or more triggers that cause:
exiting of the one or more computer systems from the lower-power mode; and
restoring of the one or more portions of the state using the computer storage, the one or more portions of the state being used to perform one or more control operations corresponding to the one or more machines.

10. The system of claim 9, wherein the power-down process includes, based at least on the at least one indication being received, triggering a reboot to at least a portion of the one or more computer systems to produce the one or more portions of the state.

11. The system of claim 9, wherein the operations include triggering the power-down process responsive to one or more of:
one or more power-off indications of the one or more machines; or
one or more terminations of one or more time intervals corresponding to a low-power mode of the one or more computer systems.

12. The system of claim 9, wherein the one or more diagnostics operations comprise latent fault testing of one or more components of the one or more computer systems.

13. The system of claim 9, wherein the power-down process is triggered by a power-off indicator and the lower-power mode includes a low-power mode.

14. The system of claim 9, wherein the system is comprised in at least one of:
- a control system for an autonomous or semi-autonomous machine;
- a perception system for an autonomous or semi-autonomous machine;
- a system for performing simulation operations;
- a system for performing deep learning operations;
- a system implemented using an edge device;
- a system implemented using a robot;
- a system incorporating one or more virtual machines (VMs);
- a system implemented at least partially in a data center; or
- a system implemented at least partially using cloud computing resources.

15. A method comprising:
- executing a power-down process of one or more computer systems of one or more machines, the power-down process including:
  - determining a completion of one or more portions of in-system testing performed on the one or more computer systems;
  - based at least on the completion, triggering suspension of one or more portions of a state of the one or more computer systems to computer storage; and
  - cause the one or more computer systems to enter into a lower-power mode; and
- based at least on at least one trigger for the one or more computer systems to exit the lower-power mode, executing a power-up process of the one or more computer systems, the power-up process including transmitting at least one trigger to cause:
  - exiting of the one or more computer systems from the lower-power mode; and
  - restoring of the one or more portions of the state from the computer storage, the one or more portions of the state being used to perform one or more control operations corresponding to the one or more machines.

16. The method of claim 15, further comprising rebooting one or more portions of the one or more computer systems prior to performance of the in-system testing based at least on an indication of a key-off of a vehicle.

17. The method of claim 15, wherein the one or more portions of the in-system testing are performed based at least on detecting one or more of:
- one or more power-off indications of the one or more machines; or
- one or more terminations of one or more time intervals corresponding to a power mode of the one or more computer systems.

18. The method of claim 15, wherein the suspension includes one or more of:
- powering down one or more sensors used to perform the one or more control operations; or
- powering down one or more graphics processing units used to perform the one or more control operations.

19. The method of claim 15, wherein the at least one trigger is transmitted based at least on receiving a power-on indication associated with the one or more machines.

20. The method of claim 15, wherein the one or more portions of the in-system testing comprises latent fault testing of one or more components of the one or more computer systems.

* * * * *